United States Patent [19]

Magan

[11] 4,100,098
[45] Jul. 11, 1978

[54] STABILIZED SOLUTIONS OF SODIUM DITHIONITE

[75] Inventor: Phillip R. Magan, Lawrenceville, Ga.

[73] Assignee: Olin Corporation, New Haven, Conn.

[21] Appl. No.: 735,356

[22] Filed: Oct. 26, 1976

[51] Int. Cl.² ............................................. C09K 3/00
[52] U.S. Cl. .................................. 252/188; 423/265; 423/515
[58] Field of Search ................ 252/188; 423/265, 515

[56] References Cited

U.S. PATENT DOCUMENTS

| | | | |
|---|---|---|---|
| 3,669,895 | 6/1972 | Shastri | 252/188 |
| 3,773,679 | 11/1973 | Kise et al. | 252/188 |
| 3,804,944 | 4/1974 | Kise et al. | 252/188 X |

Primary Examiner—Benjamin R. Padgett
Assistant Examiner—E. Suzanne Parr
Attorney, Agent, or Firm—James B. Haglind; Donald F. Clements

[57] ABSTRACT

Aqueous solutions containing mixtures of sodium dithionite and sodium sulfite having concentrations of greater than 13 percent by weight of $Na_2S_2O_4$ are stabilized by adding potassium hydroxide in an amount which is sufficient to provide a residual of from about 1 to about 12 grams per liter of solution. These solutions can be stored at temperatures of from about 0° to about 15° C. without crystallization taking place.

7 Claims, No Drawings

STABILIZED SOLUTIONS OF SODIUM DITHIONITE

This invention relates to the stabilization of solutions used in the bleaching and vat dying of textiles. More particularly this invention relates to the stabilization of aqueous solutions containing sodium dithionite and sodium sulfite.

Aqueous solutions of mixtures of sodium dithionite and sodium sulfite are employed in the bleaching of textiles. These solutions are, however, subject to decomposition on storage. To prevent extensive decomposition it is necessary to control the storage temperature and the pH of the solution.

It is known to add alkaline sodium compounds such as sodium hydroxide or sodium sulfite to stabilize solutions of sodium dithionite during storage. For example, U.S. Pat. No. 3,804,944 issued to M. A. Kise and L. C. Ellis describes the addition of dilute solutions containing up to 20 percent by weight of NaOH to control the pH of the aqueous solutions at temperatures between 35°–135° F. This process results in solutions containing from 5 percent to 12 percent by weight of sodium dithionite. U.S. Pat. No. 3,804,944 also teaches that slurries containing up to 30 percent by weight of $Na_2S_2O_4$ can be stabilized by this process. The slurries contain needle-like crystals of sodium dithionite dihydrate.

However, commercial textile operations require concentrated aqueous solutions of sodium dithionite having no crystalline material which must be redissolved. In the vat dying of textiles, for example, in package dying operations, solutions containing at least 13 percent of sodium dithionite are required which must be stable at low temperatures and free of crystalline material. The presence of crystalline material results in the solutions being non-homogeneous with respect to concentration and the crystals plug valve and metering devices required in the operation. Therefore, it is an object of the present invention to provide concentrated aqueous solutions of sodium dithionite containing sodium sulfite which are stable at low temperatures.

Another object of the present invention is to provide concentrated aqueous solutions of sodium dithionite containing sodium sulfite which can be stored at low temperatures and remain free of crystalline material.

These and other objects will be apparent from the following description of the invention.

Briefly, the foregoing objects are accomplished by a method of stabilizing aqueous solutions of mixtures of sodium dithionite and sodium sulfite which comprises preparing an aqueous solution containing greater than about 13 percent by weight of sodium dithionite and at least one percent of sodium sulfite by weight of the sodium dithionite. To the aqueous solution mixture is added potassium hydroxide in an amount sufficient to provide a residual of KOH of from about 1 to about 12 grams per liter of solution. The alkaline solution is then maintained at a temperature of from about 0° to about 15° C.

Sodium dithionite is a commercial reducing agent which is widely used in the textile and clay industries. It is conveniently supplied as an aqueous solution and the solution may be produced, for example, by the reaction of sulfur dioxide with liquid sodium amalgam. The solution produced contains a concentrated mixture of sodium dithionite and sodium sulfite. These solutions are unstable, the instability being promoted by increases in concentration, in temperature, and in acidity. To prevent or retard decomposition the solutions are diluted with water, and as stated above, are stabilized by the addition of dilute solutions of sodium alkaline compounds and stored at low temperatures. Employing these conditions, however, has limited the concentration of sodium dithionite in the solutions to about 12 percent by weight of $Na_2S_2O_4$. Certain applications require solution concentrations having higher amounts of $Na_2S_2O_4$ and up to now these have been produced by dissolving dry sodium dithionite in the aqueous solution at the point of application. This requires the user to have facilities for mixing and heating the solution to provide the desired concentrations.

Stabilized homogeneous solutions containing mixtures of sodium dithionite and sodium sulfite having concentrations of greater than 13 percent, preferably from about 13 to about 15 by weight of sodium dithionite and at least 1 percent of sodium sulfite by weight of the sodium dithionite are produced by the process of the present invention. The process comprises adding potassium hydroxide in an amount which is sufficient to provide a residual of potassium hydroxide of from about 1 to about 12, preferably from about 3 to about 8 grams per liter of solution.

In the production of sodium dithionite solutions containing sodium sulfite by the amalgam process described above, the addition of KOH takes place after the product has been removed from the reactor.

To avoid dilution of the dithionite solution, potassium hydroxide in concentrated forms, including solid KOH can be used. For ease of mixing, it is preferred to use aqueous solutions of potassium hydroxide containing at least 30 percent by weight of KOH and more preferably from about 40 to about 60 percent by weight of KOH.

Following the addition of potassium hydroxide, the dithionite solution is cooled to a temperature of from about 0° to about 15° C., and preferably from about 0° to about 7° C. At these temperatures the rate of decomposition of sodium dithionite in the solution is minimized.

The method of the present invention is illustrated by the following examples without any intention of being limited thereby.

EXAMPLE I

An aqueous solution containing 13.5% by weight of sodium hydrosulfite and 2.5% by weight of sodium sulfite was prepared by the reaction of sulfur dioxide gas with sodium amalgam in a rotary reactor. Two samples of the solution were stabilized by the addition of 50% KOH in an amount sufficient to provide a residual of 6 grams of KOH per liter of solution. The solutions were padded with nitrogen, cooled to 0° C. and analyzed. The samples were stored at 0° C. for 7 days and re-analyzed. Results for the initial and final analyses are as follows:

TABLE I

Decompostion of Sodium Hydrosulfite Solutions Containing Sodium Sulfite Stabilized with KOH and Stored at 0° C.

| Day | $Na_2S_2O_4$ (Grams per liter) | $Na_2SO_3$ (Grams per liter) |
|---|---|---|
| Sample No. 1 | | |
| 1 | 156.8 | 70.5 |
| 7. | 151.0 | 86.3 |
| Sample No. 2 | | |
| 1 | 154.6 | 72.5 |
| 7. | 149.3 | 85.1 |

Comparative Example

Two samples of the aqueous solution of Example 1 were stabilized with 50% sodium hydroxide (residual of about 8 grams of NaOH per liter), padded with nitrogen and cooled to 0° C. The initial analysis of the samples was as follows:

|    | $Na_2S_2O_4$ (Grams per liter) | $Na_2SO_3$ (Grams per liter) |
|----|--------------------------------|------------------------------|
| C1 | 158.7                          | 76.4                         |
| C2 | 157.8                          | 76.4                         |

The samples were stored at 0° C. After 1 day the samples contained crystalline material.

The above example shows that solutions containing sodium hydrosulfite and sodium sulfite where the $Na_2S_2O_4$ concentration is greater than 145 grams per liter can be stabilized with KOH and stored at low temperatures.

The solutions maintain a homogeneous concentration with no crystal formation occurring. Solutions containing sodium hydrosulfite and sodium sulfite having concentrations of sodium hydrosulfite greater than 145 grams, when stabilized with NaOH and stored at 0° C., develop crystals which result in non-homogeneous solutions containing reduced amounts of sodium hydrosulfite.

EXAMPLE 2

An aqueous solution containing 13.7 percent by weight of sodium dithionite and sodium sulfite in an amount greater than about 10 percent by weight of the sodium dithionite was continuously produced in a reactor by the reaction of sodium amalgam with gaseous sulfur dioxide. The aqueous solution was pumped from the reactor to a mixing tank where it was stabilized by the addition of an aqueous solution containing 45% by weight of potassium hydroxide to provide a residual of about 7 grams of KOH per liter of solution. The stabilized solution was cooled to a temperature of about 1° C. and transferred to a storage tank. During storage the solution remained homogeneous with no crystallization taking place.

What is claimed is:

1. A method of stabilizing aqueous solutions of mixtures of sodium dithionite and sodium sulfite which comprises:
   (a) preparing an aqueous solution containing greater than about 13 percent by weight of of sodium dithionite and at least one percent of sodium sulfite by weight of said sodium dithionite,
   (b) adding potassium hydroxide to said aqueous solution of an amount sufficient to provide a residual of potassium hydroxide in the solutions of from about 1 to about 12 grams per liter,
   (c) maintaining the aqueous solution at a temperature of from about 0° to about 15° C.

2. The method of claim 1 wherein said potassium hydroxide is added as an aqueous solution containing at least about 30 percent by weight of KOH.

3. The method of claim 2 wherein said residual of potassium hydroxide in the solution is from about 3 to about 8 L grams per liter.

4. The method of claim 1 wherein said aqueous solution is maintained at a temperature of from about 0° to about 7° C.

5. The method of claim 4 wherein said potassium hydroxide is added as an aqueous solution containing from about 40 to about 60 percent by weight of KOH.

6. The method of claim 5 wherein said residual of potassium hydroxide is from about 3 to about 8 grams per liter.

7. The method of claim 6 wherein said aqueous solution contains from about 13 to about 15 percent by weight of sodium dithionite.

* * * * *